Aug. 1, 1967 R. W. CLOWERS 3,333,651
CRAWLER-TRACK AUTOMOTIVE VEHICLE
Original Filed March 18, 1963 3 Sheets-Sheet 1

INVENTOR.
Richard W. Clowers
BY
Ralph F. Crandell
ATTORNEY

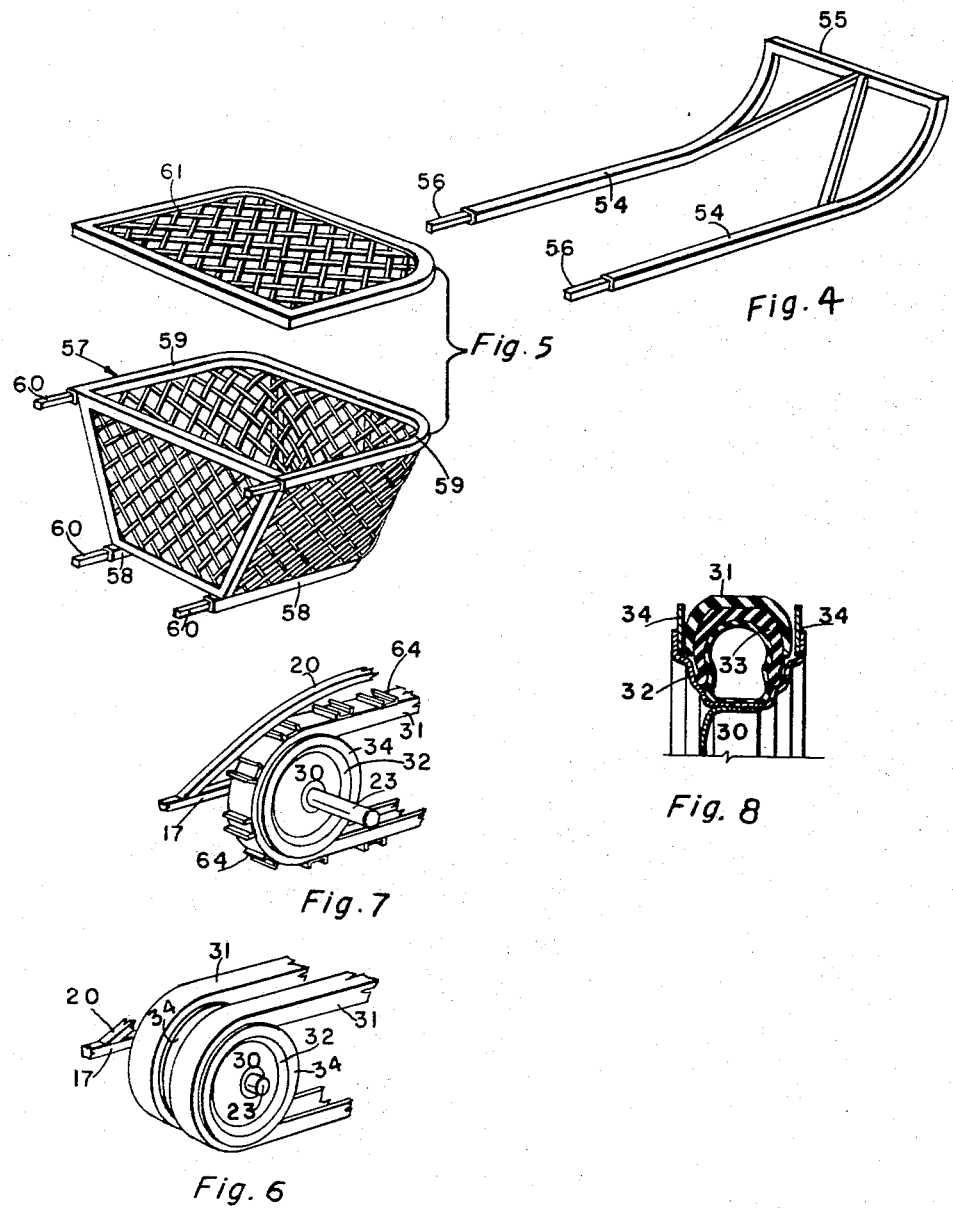

United States Patent Office 3,333,651
Patented Aug. 1, 1967

3,333,651
CRAWLER-TRACK AUTOMOTIVE VEHICLE
Richard W. Clowers, Jefferson County, Colo.
(2742 S. Fenton St., Denver, Colo. 80227)
Original application Mar. 18, 1963, Ser. No. 265,804, now Patent No. 3,219,133, dated Nov. 23, 1965. Divided and this application Sept. 13, 1965, Ser. No. 487,017
7 Claims. (Cl. 180—9.22)

This invention relates to automotive equipment regulatably and dirigibly operable to transport an operator and supplemental variable loads over substantially any and every type and condition of terrain surface with efficiency and economy, and more particularly to such equipment organized to effect its tractive propulsion through the agency of crawler tracks, and has as its principal object, the provision of a novel and improved tracked automotive vehicle of uniquely advantageous utility and practicality.

This application is a division of copending application Ser. No. 265,804, filed Mar. 18, 1963, for "Crawler-Track Automotive Vehicle," now U.S. Patent N. 3,219,133.

One object of this invention is to provide a novel and improved crawler-track automotive vehicle that is capable by virtue of its distinctive organization of traversing steep slopes and surmounting many of the natural obstacles of primitive terrain with facility and security of operator safety.

Another object of this invention is to provide a novel and improved crawler-track automotive vehicle that is exceptionally maneuverable for travel along a selected, tortuous path through trackless regions.

A further object of this invention is to provide a novel and improved crawler-track automotive vehicle that is expedient of transport by conventional facilities to and from the areas of its intended use.

Still another object of this invention is to provide a novel and improved crawler-track automotive vehicle that is amenable to wide variation of specific use adaptation.

Still a further object of this invention is to provide a novel and improved crawler-track automotive vehicle that is simple and convenient of operative regulation and control.

Still a further object of this invention is to provide a novel and improved crawler-track automotive vehicle that is susceptible of manipulation and operative control by an operator disengaged therefrom.

Still a further object of this invention is to provide a novel and improved crawler-track automotive vehicle that is feasible of economical production through ingenious correlation and operative combination of elements, components, and subcombinations themselves largely conventional and readily available.

Still a further object of this invention is to provide a novel and improved combination of coacting elements, features, and components constituting a crawler-track automotive vehicle that is inexpensive of construction from commonly-available materials and supplies, that is rugged, sturdy, and operatively reliable in a compact organization of diverse specific adaptability, that is functionally flexible for accommodation to the exigencies encountered in diverse use environments, that is exempt from onerous servicing and maintenance requirements, and that is positive and efficient in attainment of the ends for which designed.

With the foregoing and other objects in view, my invention consists in the construction, arrangement, and operative combination of elements as hereinafter set forth, pointed out in the appended claims, and illustrated by the accompanying drawings, in which:

FIG. 4 is a perspective view of the skid frame unit detached from the association with the propulsive unit represented by FIGURES 1, 2 and 3.

FIG. 5 is an exploded perspective view of a basket-type carrier adapted for detachable association with the propulsive unit in substitution for the analogous attachment represented by FIGURES 1 and 2.

FIG. 6 is a fragmentary, detail view in perspective of a dual wheel and track arrangement expedient of optical use within the contemplation of the invention.

FIG. 7 is a view similar to FIG. 9 indicating the adaptability of the tracks characterizing the invention to coaction with traction-promoting adjuncts.

FIG. 8 is a section, on a relatively-enlarged scale, taken radially of a mounting wheel in engagement wtih a track member and substantially on the indicated line 8—8 of FIG. 2.

Figure 1:
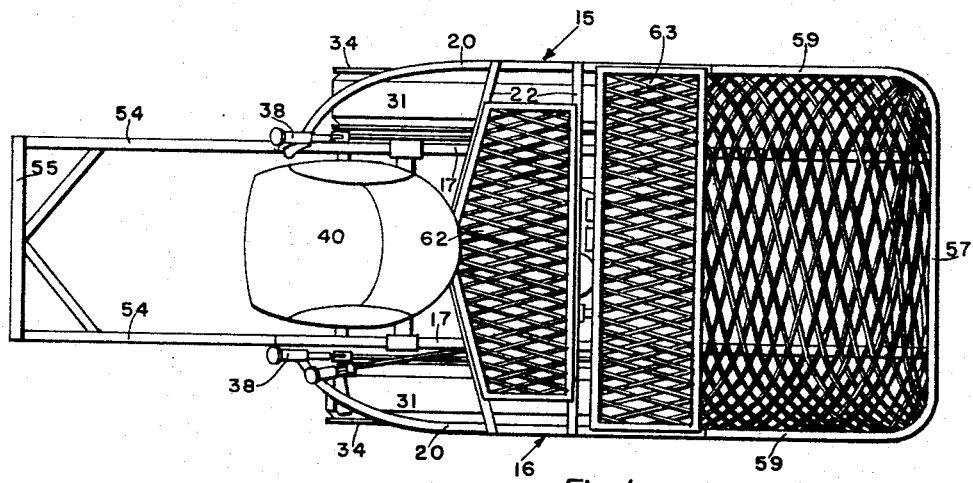
FIGURE 1 is a top plan view of a typical embodiment of the invention as organized ready for general practical use.

While certain illustrative embodiments of the present invention have been shown in the drawings and will be described below in considerable detail, it should be understood that there is no intention to limit the invention to the specific forms disclosed. On the contrary, it is the intention to cover all modifications, alternative constructions, equivalents and uses falling within the spirit and scope of the invention as expressed in the appended claims.

Occasions abound wherein, for various reasons and diverse specific purposes, powered transport of personnel and material is desired in situations and under conditions that preclude reliance upon conventional automotive equipment. Hunting, fishing, and other field sports, exploration, reaction, surveying, prospecting, construction, inspection and maintenance of power and fuel lines, rescue operations, and comparable activities are attended by and give rise to frequent need for an automotive vehicle capable of supplying powered transport away from roads and highways, through timber, over rugged terrain, and in isolated areas despite adversities of climate and weather. The instant invention is hence directed to the provision of a uniquely practical such vehicle diversely employable as itself a means of recreation and amusement in addition to its utilitarian sufficiency.

The vehicle of the instant invention includes a propulsion unit designated generally by the numeral 15. The propulsion unit 15 and its adjunctive components are cooperatively mounted upon and carried by a rigid, skeleton frame 16 constructed from light-weight, strong metal tubing, either round or angular in section. The frame is generally rectangular, of a length slightly exceeding its width and sized to be receivable for transport in the available compartment spaces of conventional automobiles. The frame 16 is formed by, a pair of like members 17 arranged in spaced parallelism longitudinally of the frame and intercoupled by a front transverse member 18 inwardly adjacent the forward end of the frame and a rear transverse member 19 at the rearward end of the frame. The members 17, 18 and 19 define a horizontal lower deck plane, parallel to and above which an upper deck plane is established by members 20 laterally offset from and overhanging the members 17 in forward convergence to engagement therewith. The converging members 20 terminate rearwardly in substantial vertical registration with, above, and laterally offset from the corresponding ends of the members 17. Inwardly adjacent their rearward ends the members 20 are braced and intercoupled by a transverse member 21 to establish a third deck plane parallel to and above those determined by the members 17 and 20, respectively, brace yokes 22 upstand from and bridge between the members 20.

The frame 16 is supported for translation on spacedly-parallel front and rear axles 23 and 24, respectively, engaged beneath and transversely of the lower frame deck members 17. It is the function of the rear axle 24 to receive and transmit propulsive power, to which end the said axle is journaled for rotation in and through bearings 25 fixed to and under the frame members 17.

The opposite ends of the axles 23 and 24 operatively mount like wheels 30, such as pneumatic tires, disposed in longitudinally-spaced, coplanar relation at each side of the frame 16, outwardly adjacent the frame members 17, and beneath the lateral overhang of the frame established by the members 20. The wheels 30 are fixed on the axle 24 for rotation thereby, and wheels 30 are rotatably journaled on the axles 23. The wheels 30 at each side of the frame 16 engage within a longitudinally extending endless, flexbile loop 31 in a cooperation constituting, and operatively completing, a crawler track organization distinctively featuring the invention. As shown in FIG. 8, the wheels 30 are of conventional construction characterized by the customary flanged rim 32 adapted to receive and mount a pneumatic tire 33. The loop 31 arranged over the wheels 30 to function as the propulsive tread of the crawler track may be, if desired, a specialized product, although a conventional pneumatic tire carcass of appropriate size can be adapted to serve with economy and full satisfaction as the loop 31, by removing the bead rings from such a conventional tire carcass.

Such a tire carcass then forms an endless loop which serves as the ground engaging track. To retain the endless loop on the wheel tires 33, annular plate extensions 34 are fixed concentrically to each side of the flanged wheel rims 32 so as to define radial enlargements of the wheel flanges. These flange extensions 34 confine the curved end margins of the loop 31 and prevent the loop from slipping off of the wheels.

To transmit power to the wheels 30, the axle 24 is operatively connected through a power train, embodying a conventional differential and transmission, to an internal combustion engine 41 mounted on the frame 16. Selective braking of the wheels 30 served by the axle 24 for consequent directional control of unit travel may be had through any preferred arrangement of means including brake handles 38 operable by an operator in a seat 40 on the frame 16, to control braking devices on one or both wheels on each side of the frame 16.

For a more detailed description of the power train, engine, braking devices and other controls and structure, reference should be made to the above mentioned Patent No. 3,219,133, the disclosure of which is incorporated by reference herein.

The weight of the engine, and other components of the power train is concentrated between the axles 23 and 24 and within the span separating the track-constituting loops 31. In this position it stabilizes the attitude of the propulsive unit during travel thereof, particularly when negotiating slopes and inclines, and tractively loads the loops 31 for efficient reaction under power.

Tracked, propulsively self-powered, and dirigible as set forth, the vehicle thus far described is a compact automotive vehicle of light weight desirably, although not necessarily, sized to be transported in conventional automobile compartments. In use, the unit is capable of self translation over unimproved terrains and through primitive environments under the control of an operator either riding the vehicle or accompanying the vehicle on foot. The stability inherent in the vehicle, resulting from correlation of power plant and power train weights with the axles and tracks as above described assures maximum operative utility of the vehicle and frees it from a tendency to flip and careen while negotiating slopes and obstacles. The arrangement of controls further serves to facilitate convenient regulation and control of the vehicle operation by a non-riding escort.

Operatively complete as an automotive vehicle, the propulsion unit 15 is amenable to diverse uses through interchangeable supplements and attachments thereto when provided with the seat 40 to be ridden by an operator when situations permit, the propulsion unit 15 desirably is supplemented for practical accommodation of a rider by a skid frame at its forward end. Such a skid frame is formed by spaced, parallel, like side bars 54 bowed upwardly at their outer ends and rigidly interbraced in secure attachment to a transverse terminal bar 55 joining said outer ends. The lateral spacing of the bars 54 corresponds with that of the frame members 17 of the unit 15. For attachment with the members 17, the bars 54 are formed at their ends remote from the bar 55 as bolts 56 outstanding in alignment therefrom and relatively-reduced size suited for reception within the open ends of the tubular members 17. Telescopic engagement of the bolts 56 within the ends of the members 17 adjacent the position of the seat 40 serves to connect the skid frame to and for support by the frame 16 of the unit 15 with the bars 54 extending as aligned continuations of the members 17 outwardly and away from the seat 40. In this manner the terminal bar 55 of the skid frame is positioned parallel to and well in advance of the unit axles 23 and 24 where it is functions as a footrest available to a seated operator in an elevation above the bars 54. The bolts 56 are of a length and shape sufficient to engage with the ends of the members 17 to support the skid frame in projection forwardly from the unit 15 above and in clearing relation with the unit support plane. The bolts are separably latched by an expedient means, not shown, against inadvertent release from the said members, there being, as is well known, many types and forms of latches and fasteners applicable to effect detachable conjunction of the bolts 56 and members 17. In addition to providing a footrest for a seated operator of the unit 15, the skid frame functions when attached to the unit to minimize and limit forward tilting of the assembly as the vehicle travels. Any tendency of the added weight of a seated operator to create forward tilting of the unit 15 is countered, by skidding engagement of the forward upwardly-bowed ends of the bars 54 with the ground to limit and determine forward tilt of the unit. Conversely, the skid frame assists passage of the unit over obstacles and obstructions against which the upwardly-bowed ends of the bars 54 may be brought to bear. When the bars engage an obstacle, continued forward travel of the unit acts through the skid frame to slide the bars 54 upwardly on and over the obstruction or obstacle. The initial rearward tilt of the assembly further helps to increase traction and assist the vehicle in passing over the obstacle. The skid frame is also available to a dismounted operator as a lever, manipulable by means of its terminal bar 55, to assist and to direct the powered progress of the unit as occasion may require. The skid frame attachment shown and described is but exemplary of a group of structurally-diverse, funtionally-specific adjuncts alike suited for alternative connection to the unit 15 in substitution for the skid frame for attainment of their intended purposes in a supplementing interchangeable coaction with the unit the same as the of the skid frame.

Figure 2:
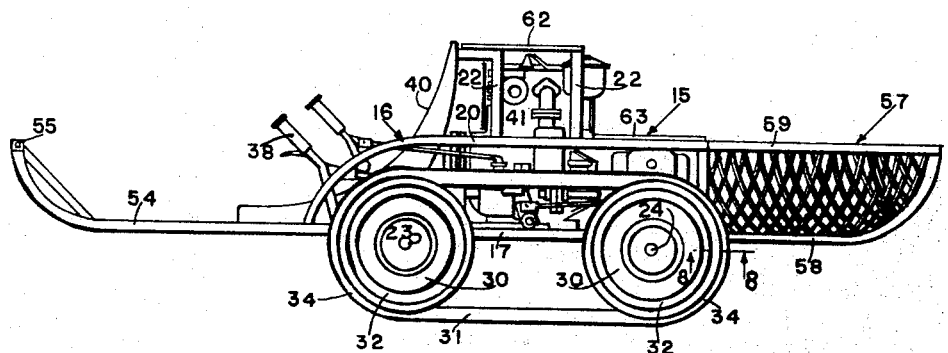
FIG. 2 is a side elevational view of the arrangement according to FIGURE 1.
Figure 3:
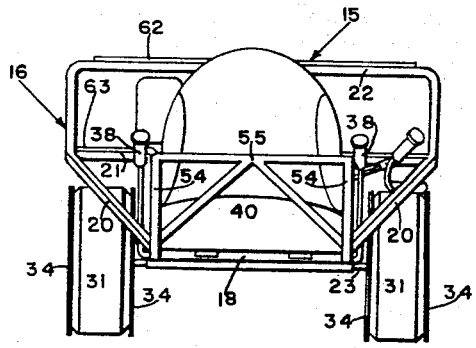
FIG. 3 is a front end elevational view of the arrangement according to FIGURES 1 and 2.
Figure 9:
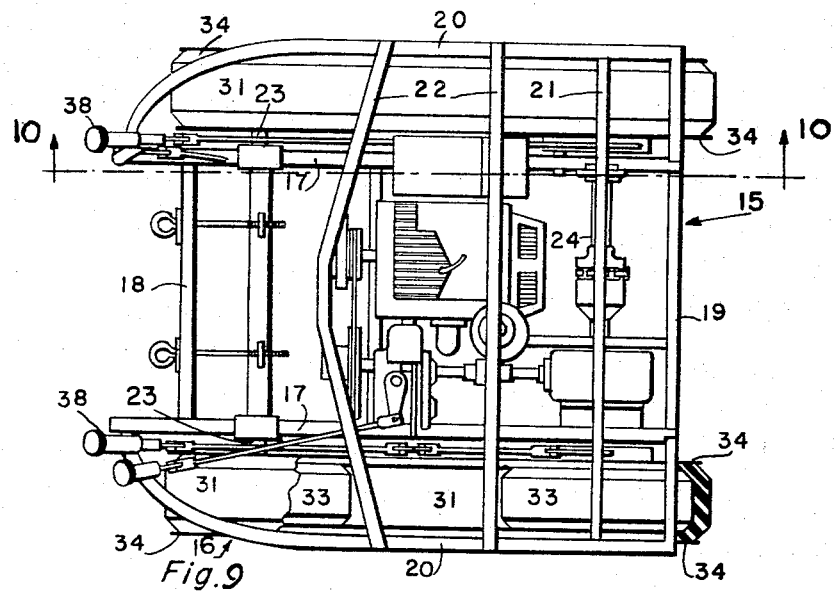
FIG. 9 is a top plan view of the propulsion unit as separated from detachable accessories and with certain parts broken away.
Figure 10:
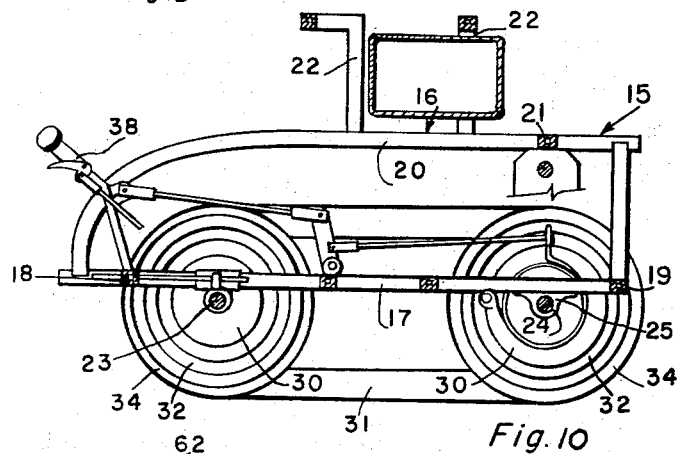
FIG. 10 is a vertical section view taken substantially in the plane of line 10—10 on FIG. 9 and with certain components of the power train omitted and certain elements broken away for clairty of representation.
Figure 11:
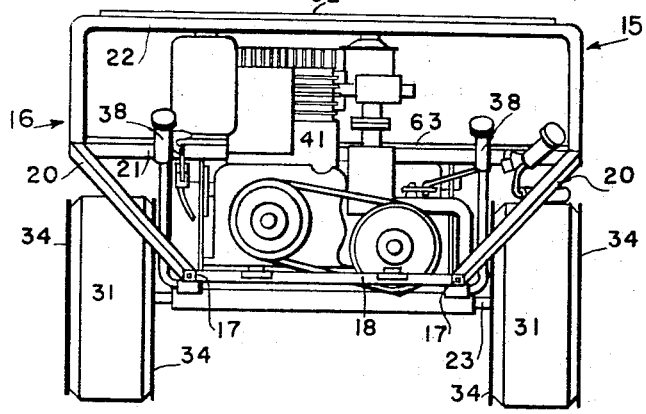
FIG. 11 is a front end elevation view of the propulsion unit as shown in FIGS. 9 and 10.

The utility and versatility of the automotive vehicle 15 are further enhanced in accordance with the principles of the invention through the attachment thereto of various carrier frame attachments such as are typically represented in FIGS. 1, 2 and 5 under the general designation 57. The supplements are susceptible of diverse specific construction and organization in adaptations suited for particular purposes, such as accommodation of passengers, equipment, tools, supplies, and the like. To this end, the carrier frame attachments 57 are alike characterized by rigidly-interrlated members 58 and 59 arranged to abuttingly register at their ends with the ends of the members 17 and 20, respectively, at the rear end of the frame 16. Analogous to the skid frame described above, the ends of the carrier frame members 58 and 59 are formed as coaligned bolts 60 slidably receivable within the open ends of the tubular members 17 and 20 for detachable interlock, as by means of suitable fasteners or latches. In this way any preferred carrier frame attachment, such as the basket type closable by a cover 61 represented by FIG. 5, may be interchangeably mounted in supported relation on the end of the frame. Such attachments are carried by the vehicle above and in clearing relation with the support plane of said unit. Inherent in the correlation of skid frame, operator's station, and carrier frame attachments the automotive vehicle is a consequent balancing of imposed loads fore-and-aft of the propulsion unit which promotes stability of the assembly in operation and efficient application of its tractive output.

The multi-deck form of the frame 16 hereinabove described expediently qualifies the propulsion unit 15 to receive and transport imposed loads, passenger or other, independently of a carrier frame attachment. It is both feasible and desirable to apply a transom 62 in secure covering relation with the upper frame deck established by the horizontal components of the brace yokes 22 where it may serve as a horizontal seat or platform for the support of loads. Similarly, a transom 63 can be secured to the second, or intermediate, deck of the frame in attachment to rearward portions of the members 20 and in overlying relation with the unit axle 24.

FIG. 6 illustrates the use of dual wheels 30 at each end of the axles 23 and 24 in operative association with dual track-constituting endless loops 31. The dual wheels serve to increase the tread area available for support and translation of the propulsion unit 15 and its attachments. To further increase the traction of the track loops 31, cleats, lugs, or other traction-promoting facilities 64 are desirably attached in spaced succession to the trend faces of the loops.

The skid frame and carrier frame attachments are adapted for separation from the compact, operatively-complete propulsion unit 15 so that the frames and propulsion unit can be transported in conventional vehicles to and from the areas of its use. As a result, the automotive vehicle of the invention is an efficient and versatile self-powered facility susceptible of ready adaptation to diverse practical uses with unique capability and manifest advantage.

Since changes, variations, and modifications in the form, construction, and arangement of the elements shown and described may be made without departing from the spirit of my invention, I wish to be understood as being limited solely by the scope of the appended claims, rather than by any details of the illustrative showing and foregoing description.

I claim as my invention:

1. A crawler-track automotive vehicle comprising a rigid frame including a pair of spaced, longitudinally extending lower side members having front and rear ends and means transversely interconnecting said lower side members to define therewith a horizontal lower deck plane, a pair of spaced, upper side members secured in converging relation with at least one of said ends of said lower side members and extending upwardly and outwardly therefrom into laterally offset horizontally and vertically spaced parallelism therewith, means transversely interconnecting said upper side members to define therewith an upper horizontal deck plane, seat means carried by said frame in vertically spaced juxtaposition to said one end of said lower side members, a pair of transversely extending front and rear axles rotatably carried by said lower side members in spaced relationship to the front and rear ends of the same respectively, wheels operatively supporting each of said axles outwardly of said lower side members and inwardly of said upper side members, the wheels engaged with the separate axles on the same side of the frame being coplanar, endless track-constituting loops operatively tensioned about and between each pair of coplanar wheels, a front frame detachably secured to said rigid frame in front of the seat means carried thereon and adapted to serve as a footrest for a seated operator, and a rear frame detachably secured to said rigid frame on the opposite end thereof from said front frame and adapted for carrying loads.

2. In the vehicle defined in claim 1, a load receiving basket mounted on and as a part of said rear frame.

3. In the vehicle defined in claim 1, an intermediate load carrying frame rigidly mounted on said main frame adjacent and rearwardly of the seat.

4. A crawler-track automotive vehicle comprising a rigid frame including a pair of spaced, longitudinally extending lower side members having front and rear ends and means transversely interconnecting said lower side members to define therewith a horizontal lower deck plane, a pair of spaced, upper side members secured in converging relationship with at least one of said ends of said lower side members and extending upwardly and outwardly therefrom into laterally offset horizontally and vertically spaced parallelism therewith, means transversely interconnecting said upper side members to define therewith an upper horizontal deck plane, a pair of transversely extending front and rear axles rotatably carried by said lower side members in spaced relationship to the front and rear ends of the same respectively, wheels operatively supporting each of said axles outwardly of said lower side members and inwardly of said upper side members, the wheels engaged with the separate axles on the same side of the frame being coplanar, endless track-constituting loops operatively tensioned about and between each pair of coplanar wheels, a front frame detachably secured to said rigid frame in front of the front axle carried thereon, and a rear frame detachably secured to said rigid frame on the opposite end thereof from said front frame and adapted for carrying loads.

5. A vehicle as defined in claim 4 wherein said front frame defines a load carrying basket.

6. A vehicle as defined in claim 5 wherein said rear frame defines a load carrying basket.

7. A crawler-track automotive vehicle as defined in claim 4, wherein an intermediate load carrying frame is rigidly mounted on said main frame.

References Cited

UNITED STATES PATENTS

| | | |
|---|---|---|
| 2,495,057 | 1/1950 | Dillingham. |
| 2,592,023 | 4/1952 | Gleason. |
| 2,765,860 | 10/1956 | Church _____ 180—9.24 X |
| 2,818,266 | 12/1957 | Cabler. |
| 2,887,343 | 5/1959 | West. |
| 2,973,822 | 3/1961 | Merry _____ 180—9.22 X |

FOREIGN PATENTS

| | | |
|---|---|---|
| 198,138 | 6/1958 | Austria. |
| 252,815 | 10/1912 | Germany. |

BENJAMIN HERSH, *Primary Examiner.*

RICHARD J. JOHNSON, *Examiner.*